(12) United States Patent
Fujihira et al.

(10) Patent No.: US 8,544,406 B2
(45) Date of Patent: Oct. 1, 2013

(54) METER DEVICE FOR MOTORCYCLE

(75) Inventors: Daisuke Fujihira, Wako (JP); Tomohiro Kudo, Wako (JP); Kunihiko Fukui, Wako (JP); Makoto Hattori, Wako (JP); Yutaka Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 384 days.

(21) Appl. No.: 12/958,940

(22) Filed: Dec. 2, 2010

(65) Prior Publication Data

US 2011/0132254 A1 Jun. 9, 2011

(30) Foreign Application Priority Data

Dec. 4, 2009 (JP) .................................. 2009-276388

(51) Int. Cl.
- *G01D 13/00* (2006.01)
- *G01D 13/22* (2006.01)
- *B60Q 1/54* (2006.01)

(52) U.S. Cl.
USPC ...... 116/62.1; 116/304; 116/332; 116/DIG. 6

(58) Field of Classification Search
USPC ................ 116/284, 286, 287, 288, 304, 332, 116/DIG. 5, DIG. 6, DIG. 36, 62.1, 62.4; 368/228, 238
See application file for complete search history.

(56) References Cited

U.S. PATENT DOCUMENTS

| | | | | | |
|---|---|---|---|---|---|
| 2,213,853 | A | * | 9/1940 | Whitehead | 116/332 |
| 2,775,220 | A | * | 12/1956 | Dorn et al. | 116/288 |
| 3,603,282 | A | * | 9/1971 | Abromaitis | 116/288 |
| 4,693,613 | A | * | 9/1987 | Ritchie | 368/238 |
| 4,848,264 | A | * | 7/1989 | Knietzsch et al. | 116/332 |

FOREIGN PATENT DOCUMENTS

| | | | |
|---|---|---|---|
| FR | 2782162 A1 | * | 2/2000 |
| JP | 60-173019 U | | 11/1985 |
| JP | 63095318 A | * | 4/1988 |
| JP | 08271289 A | * | 10/1996 |
| JP | 10206197 A | * | 8/1998 |
| JP | 2001-114171 A | | 4/2001 |
| JP | 2003-344120 A | | 12/2003 |
| JP | 2005-088623 A | | 4/2005 |
| JP | 2006-103361 A | | 4/2006 |
| JP | 2008122305 A | * | 5/2008 |
| JP | 2009216661 A | * | 9/2009 |
| JP | 2009229186 A | * | 10/2009 |

* cited by examiner

*Primary Examiner* — Richard A Smith
(74) *Attorney, Agent, or Firm* — Squire Sanders (US) LLP

(57) ABSTRACT

A meter device is disposed on an upper surface of a fuel tank that is disposed between a steering handlebar and a rider's seat. The meter device includes a dial substrate having a scale and a pointer that is rotated by a drive portion and points to the scale corresponding to a measurement output. The pointer includes a ridge that extends in a longitudinal direction and a spine portion having two surfaces that cross each other so as to form the ridge. An angle β, at which the two surfaces forming the ridge cross each other, is formed into an acute angle, so that a side farther from the ridge as viewed from a side of a rider is not visible.

14 Claims, 9 Drawing Sheets

METER DEVICE FOR MOTORCYCLE

BACKGROUND

1. Field

The present invention relates, in general, to meter or gauge devices for motorcycles and, in particular, to a meter device for a motorcycle disposed on a fuel tank that is disposed forwardly of a rider's seat.

2. Description of Related Art

A motorcycle has a meter device or a gauge set that includes, for example, a speedometer, an engine tachometer, and a fuel gauge. Such a meter device is very often disposed near a center portion of a steering handlebar, while a known motorcycle has a meter device disposed on a fuel tank that is disposed forward of a rider's seat. Patent Documents 1 and 2 disclose examples of motorcycles having a meter device disposed on the fuel tank. Patent Document 1 proposes a mounting member that is devised to permit easy removal or installation of a meter device to best suit a particular application or user. Patent Document 2, on the other hand, proposes a structure that disposes a vehicle meter in flush alignment with a surface of a meter cover for enhanced visibility of the meter.

PRIOR ART DOCUMENTS

Patent Document

Patent Document 1
Japanese Patent Laid-open No. 2005-88623
Patent Document 2
Japanese Patent Laid-open No. 2006-103361

SUMMARY

Conventional meter devices offer improved visibility for the rider. Assume, however, a requirement in which the meter device is disposed on an upper surface of a fuel tank that is disposed in a substantially horizontal position. If a dial (or a pointer surface) of the meter is to be disposed at right angles with respect to a rider's eyes in this condition, the meter device can significantly protrude from the upper surface of the fuel tank. Such arrangements are difficult to implement and, as a result, the rider's eyes disposed at a large angle relative to a front surface of the meter device. Specifically, the rider views an indicator surface of the meter device from an even more obliquely downward direction than with the meter device disposed near the steering handlebar. There is therefore a need for a novel configuration that prevents indication deviation from occurring, the indication deviation being a condition in which relative positions of a pointer indicating a rotating speed in the meter device and an indicating scale of, for example, speed as viewed from the rider's eyes do not fall into a desired relation.

The reason why the pointer does not seem to read correctly the indicating scale is because the pointer is large in width and height and a distance is great between the pointer and the dial on which the indicating scale is marked.

SUMMARY

To solve the foregoing problem, it is therefore an object of the present invention to provide a meter device for a motorcycle having a pointer whose shape is defined so as to permit reading of an indicating scale with little indication deviation even with a meter device that is disposed at a position such that rider's eyes are obliquely downward relative to a dial.

To achieve the foregoing object, a meter device for a motorcycle, having a dial substrate with a scale and a pointer that points to the scale corresponding to a measurement output, is characterized in the following points.

The meter device according to an aspect of the present invention can have a pointer which includes a ridge that extends in a longitudinal direction and a spine portion having two surfaces that cross each other so as to form the ridge. The spine portion can be shaped such that, with the pointer pointing to the scale in a crosswise direction of a vehicle body, a surface on a vehicle forward side of the two surfaces forming the spine portion is invisible from a rider of a motorcycle sitting in a rider's seat. In certain embodiments, an angle, at which the two surfaces forming the ridge cross each other, is acute.

The meter device according to embodiments of the invention can also include a drive portion that drives the pointer and a connecting member for connecting the pointer with an output shaft of the drive portion. The pointer can be disposed on a mounting seat of the connecting member and a base portion that is downwardly continuous with the spine portion of the pointer has a lowermost surface extended more on a side of the dial substrate than the mounting seat.

In certain embodiments, the pointer and the scale constitute a speed indicator of the motorcycle.

In certain embodiments, the meter device is disposed on a fuel tank that is disposed between a steering handlebar and a rider's seat.

In certain embodiments, a clearance between a lower surface of the pointer and the dial substrate is set to be equal to, or less than, a vertical dimension of the pointer.

In certain embodiments, the ridge of the pointer has a gradient such that the ridge approaches a side of the dial substrate more toward a leading end of the pointer relative to a center of rotation of the pointer and a vertical drop of the ridge caused by the gradient is set to be greater than a vertical dimension of the leading end of the pointer.

In other embodiments, a ratio between a vertical dimension of the base portion of the pointer and a vertical dimension of the spine portion of the pointer is set such that the vertical dimension of the spine portion is greater than the vertical dimension of the base portion toward the leading end of the pointer.

According to a first characteristic of the aspect of the present invention, the spine portion is shaped such that, of the two surfaces forming the spine portion of the pointer, the surface on the vehicle forward side is invisible from the rider sitting in the rider's seat. Consequently, with the pointer in a horizontal position, specifically, pointing in a crosswise direction relative to the dial surface, the surface on a far side of the ridge of the two surfaces forming the spine portion, specifically, the surface that is farther from a viewer of the pointer can have a smaller visible area (the surface on the forward side of the vehicle body). A reading error due to scale indication deviation can therefore be minimized between when the pointer is viewed from above and from a slant direction.

According to a second characteristic of the aspect of the present invention, the ridge that extends in a longitudinal direction of the pointer forms an acute angle. The pointer is therefore viewed sharply. Further, as compared with a known pointer in which the ridge is angled to be an obtuse angle, with the pointer in a horizontal position, specifically, pointing in a crosswise direction relative to the dial surface, the surface on a far side of the ridge of the two surfaces forming the spine portion, specifically, the surface that is farther from a viewer of the pointer can have a smaller visible area (the surface on the forward side of the vehicle body). A reading error due to scale indication deviation can therefore be minimized between when the pointer is viewed from above and from a slant direction.

According to a third and sixth characteristics of the aspect of the present invention, the lowermost surface of the pointer is even closer to the upper surface of the dial substrate. When the pointer is viewed obliquely, a position of the scale to which a front portion of the lowermost surface of the pointer, specifically, a portion close to the viewer points can be made closer to a position of the pointer as viewed from straight above. A scale reading error can therefore be minimized.

According to a fourth characteristic of the aspect of the present invention, running speed of the motorcycle can be correctly recognized.

According to a fifth characteristic of the aspect of the present invention, the meter device is disposed on the fuel tank, which eliminates the need for angling the meter device. Indication deviation can therefore be minimized without having to protrude the meter device large from an upper surface of the fuel tank. The meter device can therefore be disposed to follow along a profile of the fuel tank, which enhances design performance (specifically, the meter device can be visually attractive).

According to the seventh and eighth characteristics of the aspect of the present invention, the pointer tapers in a vertical direction (specifically, height direction) and a ratio of the spine portion to the base portion is large. When the meter device is viewed from the rider's side, the spine portion on the opposite side is hard to see even more. This minimizes indication deviation.

According to embodiments of the present invention, the greatest effect can be achieved when the pointer points to the scale in a crosswise direction of the vehicle body. Additionally, when the pointer points to the scale in a forward direction of the vehicle body, too, an effect of minimizing a scale reading error can be expected because the pointer does not seem to be broad. In the present invention, an apex portion of the pointer, specifically, the angle at which the two surfaces forming the ridge cross each other or the shape of the spine portion is only changed without narrowing the width of the pointer. Consequently, a scale reading error can be minimized without allowing the entire pointer to be hard to view as a result of narrowing the width.

DETAILED DESCRIPTION

Figure 2:
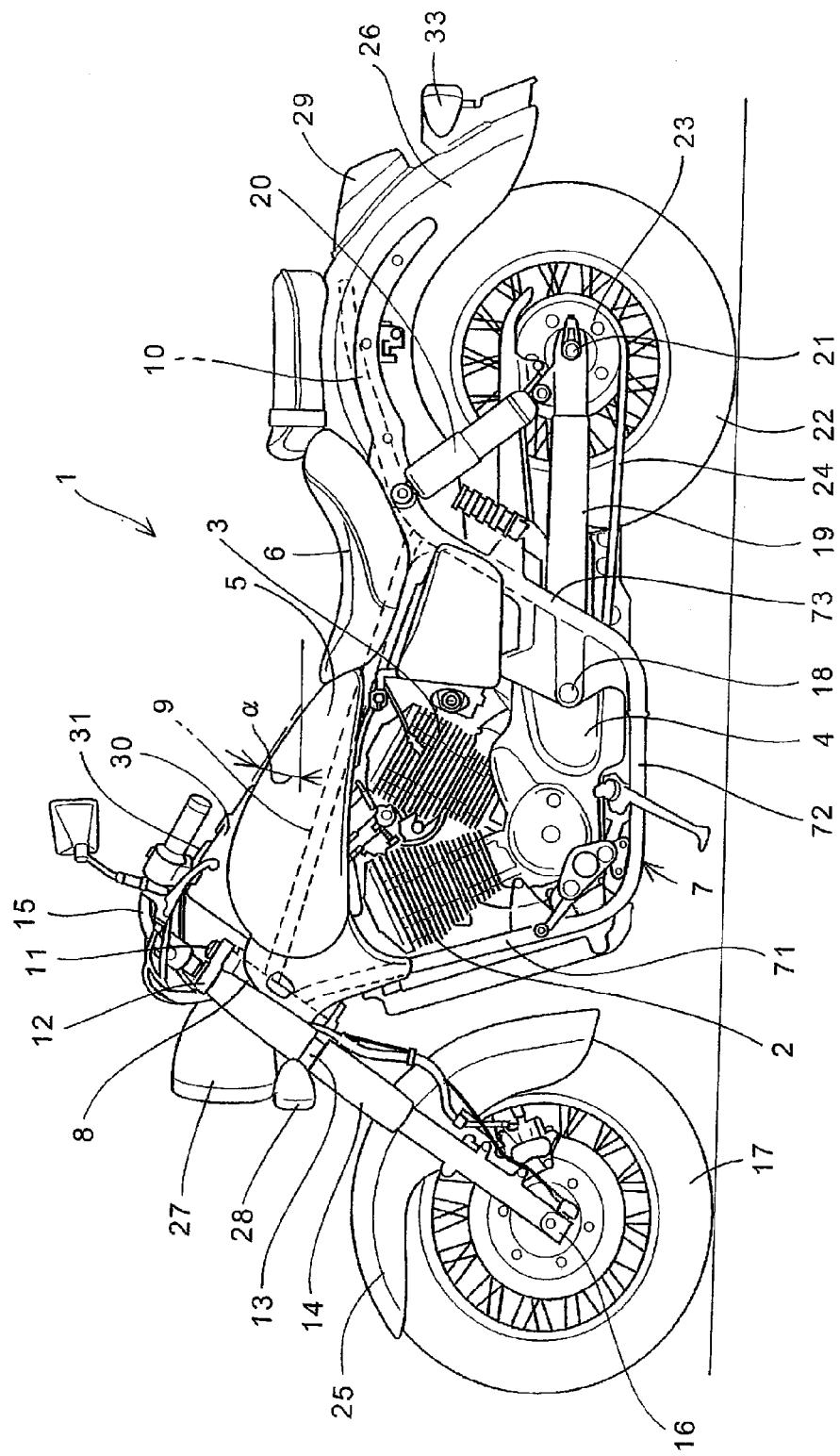
FIG. 2 is a left side elevational view showing a motorcycle having the meter device according to an embodiment of the present invention.

A specific embodiment to which the present invention is applied will be described below with reference to the accompanying drawings. FIG. 2 shows a motorcycle 1 that can be, for example, a cruiser type (also known as an "American type"). This example of motorcycle 1 includes an engine having two-cylinders 2, 3, a transmission unit 4, a fuel tank 5, and a rider's seat 6. Specifically, the two-cylinders 2, 3 are disposed to form a letter V, set at a predetermined angle to each other in a vehicle longitudinal direction. The transmission unit 4 is disposed downwardly of the engine cylinders 2, 3. The fuel tank 5 is disposed upwardly of the engine cylinders 2, 3. The rider's seat 6 is disposed rearwardly of the fuel tank 5.

The engine cylinders 2, 3 and the transmission unit 4 are mounted on a lower frame 7 that forms part of a vehicle body frame. The lower frame 7 is a pair of left and right pipe members including vertical sections 71, horizontal sections 72, and rearward sections 73. Specifically, the vertical sections 71 extend downwardly from a head pipe 8 disposed at a front portion of a vehicle body. The horizontal sections 72 extend horizontally on a lower portion of the vehicle body from lower portions of the vertical sections 71. The rearward sections 73 extend upwardly toward the rear from rear portions of the horizontal sections 72. The fuel tank 5 is mounted on a main frame (indicated by a dotted line in FIG. 2) 9 that extends slightly downwardly toward the rear from the head pipe 8. The main frame 9 is joined to the rearward section 73 of the lower frame 7 at a rear portion. A rear frame 10 extends from the joint. The rider's seat is mounted across the main frame 9 and the rear frame 10.

The head pipe 8 has a steering shaft 11 that vertically penetrates therethrough. The steering shaft 11 has an upper portion to which a top bridge 12 is connected and a lower portion to which a bottom bridge 13 is connected. The top bridge 12 and the bottom bridge 13 together support a pair of left and right front forks 14. A steering handlebar 15 is mounted on the top bridge 12. A front wheel 17 is rotatably supported by a front axle 16 at a lower portion of the front forks 14.

A swing arm 19 that has a front portion thereof supported by a pivot 18 is connected to the lower frame 7. The swing arm 19 has a rear portion thereof connected to the rear frame 10 via a rear suspension 20. A rear wheel 22 as a drive wheel is rotatably supported by a rear axle 21 at a position in the rear portion of the swing arm 19, more rearward of the connection with the rear suspension 20, specifically, at a rear end of the swing arm 19. A drive sprocket (not shown) disposed on an output shaft of the transmission unit 4 and a sprocket 23 of the rear wheel 22 are connected by a chain 24 so as to be capable of power transmission.

The front forks 14 support a front fender 25 that covers an upper surface of the front wheel 17. A rear fender 26 that covers an upper surface of the rear wheel 22 is mounted on the rear frame 10. A lighting apparatus includes a headlight 27, a front flasher 28, a tail lamp 29, and a rear flasher 33.

A meter mounting base 30 is fixed on an upper surface of the fuel tank 5. A meter device 31 is fitted into the meter mounting base 30. The meter device 31 is disposed in a posture in which an upper surface thereof is raised to an angle of a from the horizontal. This is to ensure that a rider sitting on the rider's seat 6 views an indicating surface of the meter device 31 as easily as possible.

In the embodiment of the present invention, a pointer structure incorporates a novel idea in order not only to make the indicating surface easier to view, but also to allow an indicating scale indicated by an indicating pointer included in the meter device 31 to be read correctly. This will be described in the following.

Figure 3:
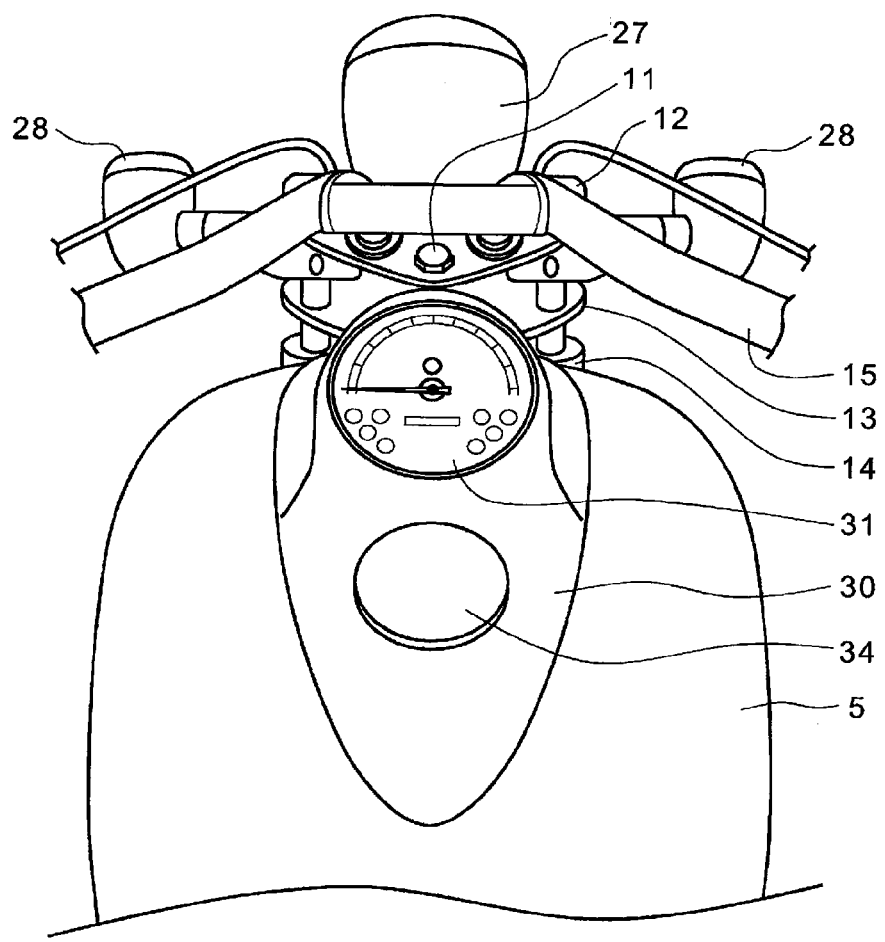
FIG. 3 is a perspective view showing a main section of the motorcycle having the meter device according to an embodiment of the present invention.

FIG. 3 is a perspective view showing a main section of the motorcycle 1 having the meter device 31. Like reference numerals refer to like parts as in FIG. 2. The meter device 31 includes at least a speedometer. The meter mounting base 30 on which the meter device 31 is mounted is disposed at a central portion in a width direction at a front portion of the fuel tank 5. The meter device 31, having an indicating surface 32 that is circular in a top view, is disposed at a front portion of the meter mounting base 30. The meter mounting base 30 can include a lid 34 of a fuel supply port disposed on a rearward side of the vehicle body relative to the meter device 31. The fuel supply port and the lid 34 thereof may be disposed at, for example, a position on the right of the meter mounting base 30, instead of the position shown in FIG. 3.

Figure 4:
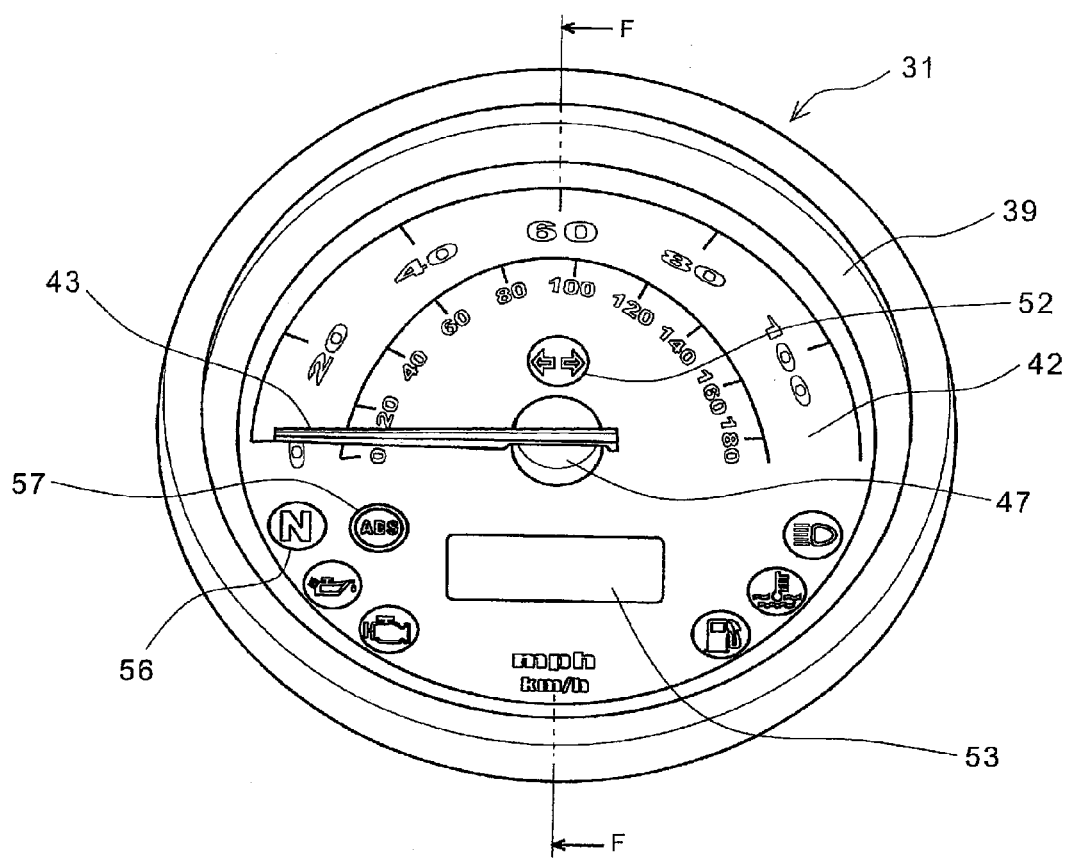
FIG. 4 is a perspective view showing the meter device as viewed from a vehicle body upper rearward direction.
Figure 5:
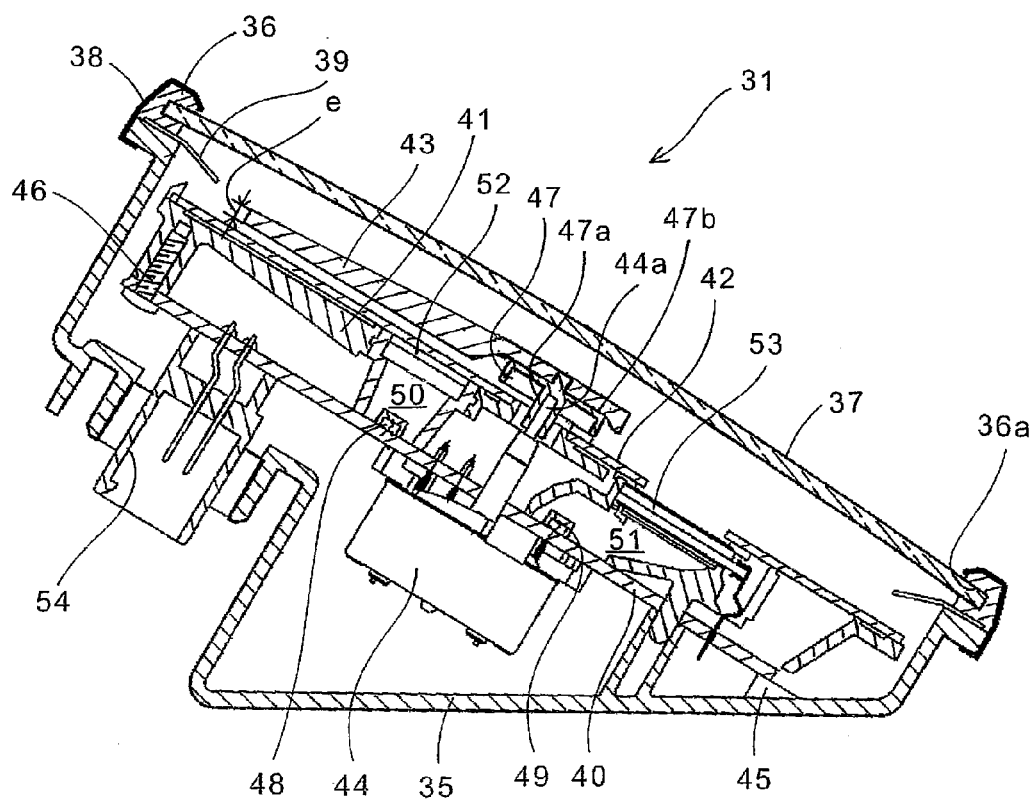
FIG. 5 is a cross-sectional view showing the meter device.

FIG. 4 is a perspective view showing the meter device 31 as viewed from a vehicle body upper rearward direction (specifically, from the rider's side). FIG. 5 is a cross-sectional view showing the meter device 31. Note that FIG. 4 is a perspective view showing an upper section of the meter device 31 mounted on the meter mounting base 30, to be observed from the outside.

Referring to FIG. 5, an annular member 36 as a lens holding member is attached to a peripheral edge of an open upper portion of a case 35 of the meter device 31. The annular member 36 has a groove 36a formed in an inner peripheral surface thereof. An outer peripheral edge of a lens 37 fits into the inner peripheral groove 36a, so that the lens 37 is fixed in the annular member 36. The annular member 36 may be formed of a material that can flex (for example, rubber) when the lens 37 is fitted into the inner peripheral groove 36a. A retaining ring 38 connects together the annular member 36 and an upper portion peripheral edge of the case 35. The retaining ring 38 is an externally exposed member and, preferably, is subjected to surface treatment offering high design performance, such as chrome plating. An annular blank plate 39 is sandwiched between the annular member 36 and the upper portion peripheral edge of the case 35 to fix the two parts together.

A substrate 40, a stay 41, a dial substrate 42 that forms a pointer surface including a speed scale, a pointer 43, and a drive portion (motor) 44 of the pointer 43 can be accommodated in a space enclosed by the case 35 and the lens 37. The substrate 40 is supported on a boss 45 (provided in plurality on an inner peripheral surface) that protrudes from an inner surface of the case 35. The stay 41 is attached to an upper surface of the substrate 40 by using, for example, a set screw 46 and the dial substrate is disposed on an upper surface of the stay 41. The drive portion 44 is mounted on a lower surface at a central portion of the substrate 40. The drive portion 44 has an output shaft 44a that penetrates through the substrate 40 to reach the dial substrate 42 disposed upwardly thereof. A connecting member 47 of the pointer 43 is connected to the output shaft 44a. The connecting member 47 includes a shank 47a and a mounting seat 47b therearound. A portion of the shank 47a downward of the mounting seat 47b has a hole in which the output shaft 44a fits, while a portion of the shank 47a upward of the mounting seat 47b protrudes so as to be engaged with, and thereby correctly position, the pointer 43.

In addition, illuminating LEDs 48, 49 are disposed on the substrate 40. The stay 41 includes bulkheads formed to define light guiding paths 50, 51 for the LEDs 48, 49. An indicating portion 52 formed from a transmissive material is irradiated with light from the LED 48 guided through the light guiding path 50. On the other hand, an indicating portion 53 formed from a light-transmissive material is irradiated with light from the LED 49 guided through the light guiding path 51. The indicating portion 52 is a direction indicating portion, while the indicating portion is an odometer/trip recorder. Different types of indicating portions are disposed as shown in FIG. 4, each being irradiated with light from an LED not shown from a backside (lower side).

A receptacle 54 is attached on a lower surface of the substrate 40. The receptacle 54 receives a connector (not shown) that is connected to a harness for supplying power or signals to, for example, the drive portion 44 or LEDs 48, 49 mounted on the substrate 40. The receptacle 54 protrudes downwardly through a hole formed in the case 35.

The blank plate 39 covers a gap between the stay 41, the dial substrate 42 and the case 35 to thereby hide an internal structure of the meter device 31 from the outside, thus functioning to enhance design performance.

Referring to FIG. 4, a plurality of indicating portions are disposed on the dial substrate 42 of the meter device 31 including, for example, a transmission neutral position indicating portion 56 and an ABS operation indicating portion 57, in addition to the direction indicating portion 52 and the odometer/trip recorder 53. An upper half (a forward side of the connecting member 47 of the pointer 43) area of the dial substrate 42 is a speedometer scale area indicating speed of the motorcycle 1, calibrated for two types of units, miles/hour and kilometers/hour, over a rotating angle of 180 degrees of the pointer 43. The drive portion 44 is driven in accordance with a detected output of a well-known vehicle speed sensor. The pointer 43 reads a running speed scale corresponding to the detected output of the vehicle speed sensor.

Figure 1:
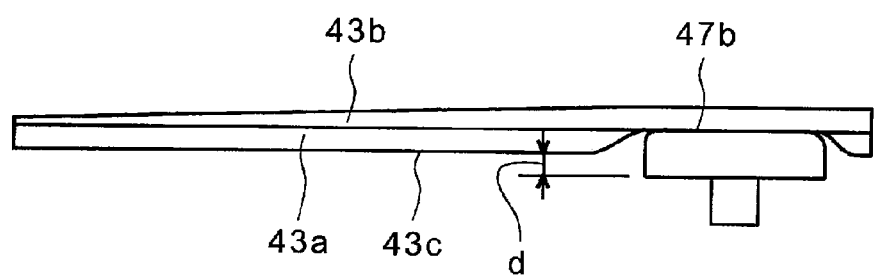
FIG. 1 is a side elevational view showing a pointer included in a meter device according to an embodiment of the present invention.
Figure 6:
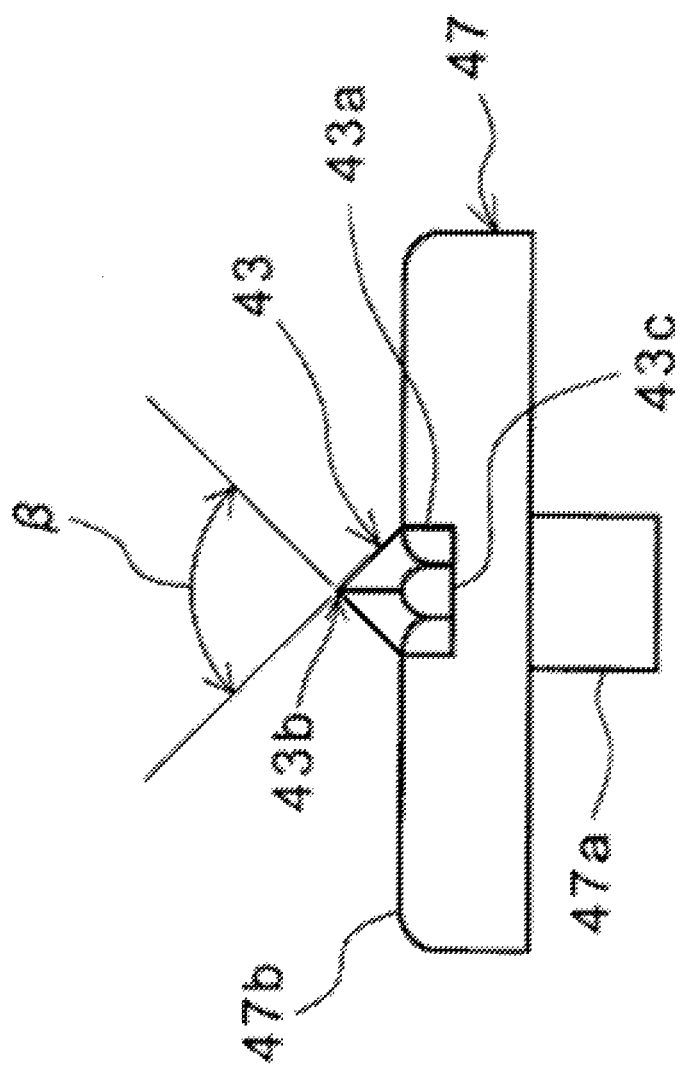
FIG. 6 is a front elevational view showing a pointer included in the meter device according to an embodiment of the present invention.

FIG. 1 is a side elevational view showing the pointer 43. FIG. 6 is a front elevational view showing the pointer 43, specifically, a view as viewed from the left in FIG. 1. The pointer 43 includes a base portion 43a as a lower portion and a spine portion 43b as an upper portion. The base portion 43a has a lower surface 43c thereof protruding downwardly from an upper surface of the mounting seat 47b so as to be closer to the dial substrate 42. By having a small distance d between the lower surface 43c of the base portion 43a and the dial substrate 42, a reading error of the scale position indicated by the pointer 43 can be minimized between when the pointer 43 is viewed from above and from a slant direction, as will be described later.

In addition, edges at the spine portion 43b of the pointer 43 cross each other at an angle β to form a so-called triangular roof in a front view (specifically, in FIG. 6). The angle β of the triangular roof is set to be less than 90 degrees. In the conventionally known pointer 43, a plane crossing angle (specifically, a ridge angle) β of the spine portion 43b is an obtuse angle, specifically, is equal to, or more than, 90 degrees. In the embodiment of the present invention, the angle β is set to be an acute angle (less than 90 degrees) in order to minimize the reading error of the pointer 43.

Figure 7:
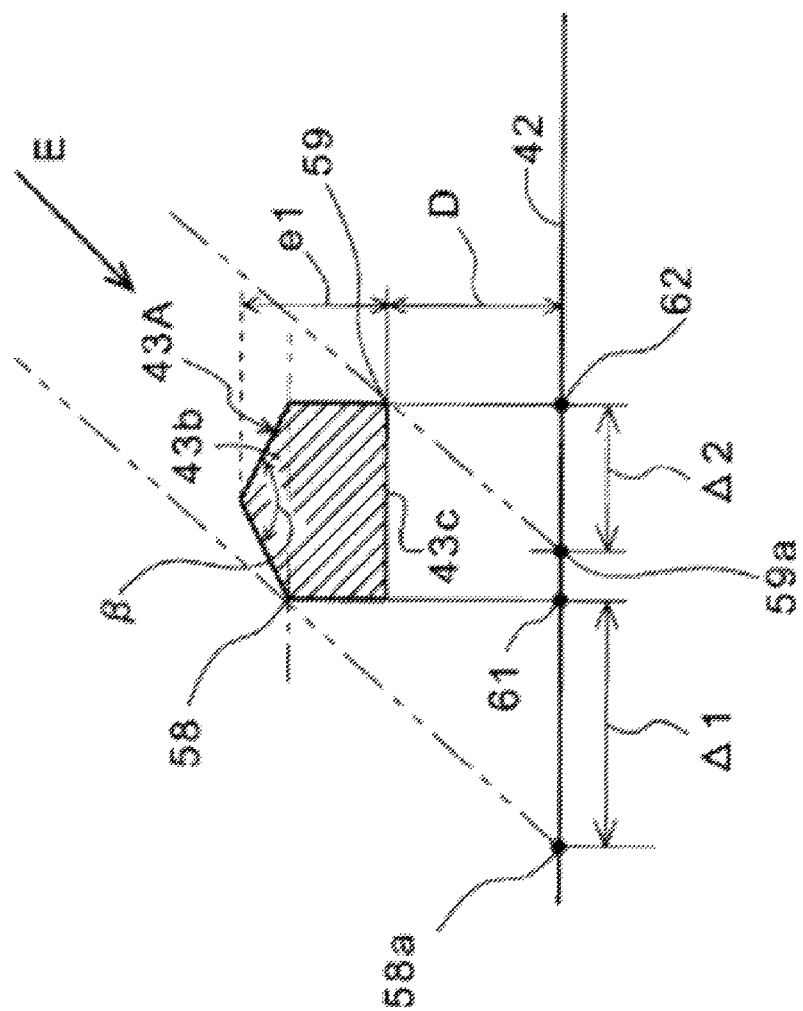
FIG. 7 is a diagram illustrating operation of the prior-art meter device.
Figure 8:
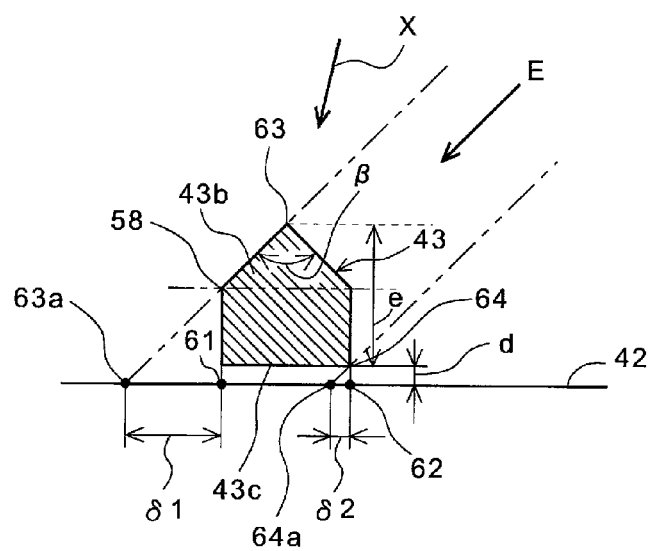
FIG. 8 is a diagram illustrating operation of the meter device according to an embodiment of the present invention.

Setting the angle β of the triangular roof of the spine portion 43b will have the following effects. FIG. 7 is a transverse cross-sectional view of the pointer of the prior-art meter device, showing a positional relationship relative to the dial substrate 42 according to the prior-art meter device. FIG. 8 is a transverse cross-sectional view of the pointer, showing a positional relationship relative to the dial substrate 42 according to the embodiment of the present invention.

In FIG. 7, the angle β of the spine portion of a pointer 43A is an obtuse angle of 90 degrees or more. In FIG. 8, the angle β of the spine portion of the pointer 43 is an acute angle of less than 90 degrees.

In the pointer 43 of the embodiment of the present invention, the base portion 43a bulges downwardly, so that the distance d between the lower surface 43c and the dial substrate 42 is set to be smaller than a distance D in the pointer 43A of the prior-art meter device. Specifically, in the prior-art meter device, the distance D is greater than a vertical dimension (height) e1 of the pointer 43A. In the embodiment of the present invention, on the other hand, the gap between the pointer 43 and the dial substrate 42, specifically, the distance d is extremely smaller than a height e. This results in the following difference in indication deviation.

When the rider views the meter device 31 from an arrow E direction, in the pointer 43A according to the prior-art embodiment, a speed scale to which the pointer 43A points can be read at, for example, a position 58a that represents an edge 58, at which the base portion crosses the spine portion, projected onto the dial substrate 42. Similarly, a speed scale to which the pointer 43A points can also be read at a position 59a that represents a lower edge 59 of the pointer 43A projected onto the dial substrate 42. In the prior-art embodiment, reading positions of the pointer 43A as viewed from the front (from a straight upward direction) are reference numerals 61, 62. Consequently, in the prior-art embodiment, deviation between the reading position 61 read from the front and the position 58a and that between the reading position 62 read from the front and the position 59a are Δ1 and Δ2, respectively.

When the meter device 31 according to an embodiment of the present invention is viewed from the arrow E direction, on the other hand, one of reading positions of the speed scale is a position 63a that represents an upper edge (ridge) 63 of the spine portion 43b projected onto the dial substrate 42 and a position at which the pointer 43 points to the speed scale. Another reading position of the speed scale is a position 64a that represents a lower edge 64 of the pointer 43 projected onto the dial substrate 42 and a position at which the pointer 43 points to the speed scale. Consequently, in the embodiment of the present invention, deviation between the reading position 61 read from the front and the position 63a and that between the reading position 62 read from the front and the position 64a are 61 and 62, respectively.

Referring to FIGS. 7 and 8, it is understood that the deviation δ1 is smaller than the deviation Δ1 and that the deviation δ2 is smaller than the deviation Δ2. Specifically, in an embodiment of the present invention, an error in reading values between when the dial substrate 42 of the meter device 31 is viewed from the front and when viewed from an oblique direction can be made smaller than in the prior-art embodiment. This effect is achieved by the following two arrangements: one, the angle β at the upper edge, specifically, the ridge of the spine portion 43b of the pointer 43 is an acute angle; and two, the lower surface 43c of the base portion 43a is brought closer to the dial substrate 42.

The arrangement in which the angle β of the ridge is an acute angle results in the following. Specifically, if the pointer 43 that extends horizontally is viewed from a rearward direction of the vehicle body obliquely at an angle of 45 degrees, either the upper edge 63 of the spine portion 43b of the pointer 43 overlaps an edge 58 of the base portion 43a or the edge 58 is invisible. To state it another way, it follows also that the rider who sits in the rider's seat sets the angle β such that the edge 58 toward the front of the vehicle is not visible. The lower surface 43c of the base portion 43a of the pointer 43 is then made as close as possible to the dial substrate 42.

Figure 11:
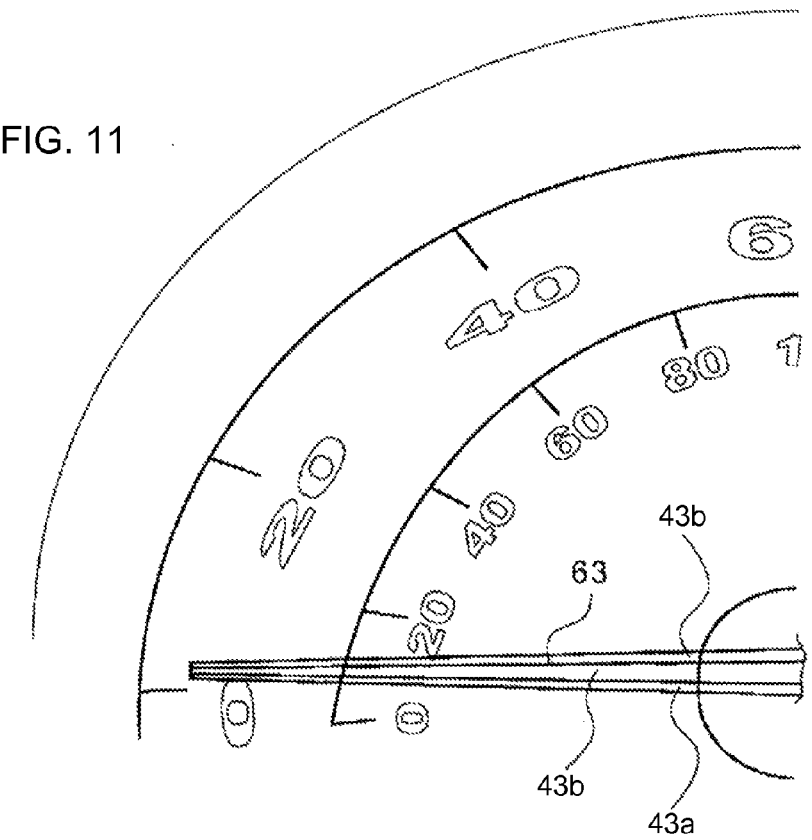
FIG. 11 is a perspective view showing a main section of a dial substrate and the pointer.

FIG. 11 shows how the pointer 43 is viewed when viewed from an arrow X direction in FIG. 8. FIG. 11 is a perspective view showing the dial substrate 42 as viewed from an obliquely upwardly direction. Referring to FIG. 11, of the two surfaces 43b, 43b that form the ridge 63 of the pointer 43, one on the upper side, specifically, the side farther from the rider sitting in the rider's seat 6 is viewed to be smaller in area than one on the side closer to the rider. Consequently, the rider recognizes the pointer more sharply than when the pointer 43 is otherwise configured for its large transverse area, offering an effect of making indication deviation smaller.

Figure 9:
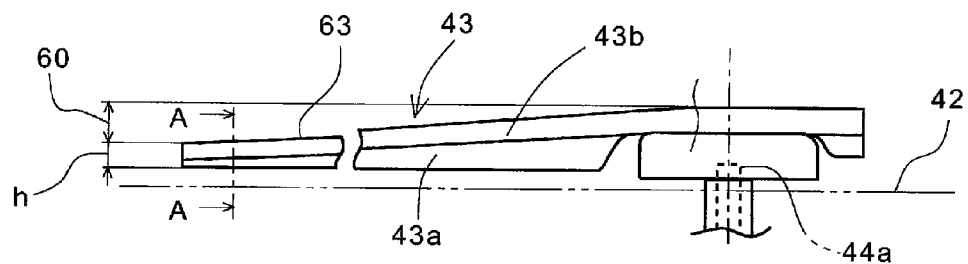
FIG. 9 is an enlarged side elevational view showing a main section of a pointer 43.
Figure 10:
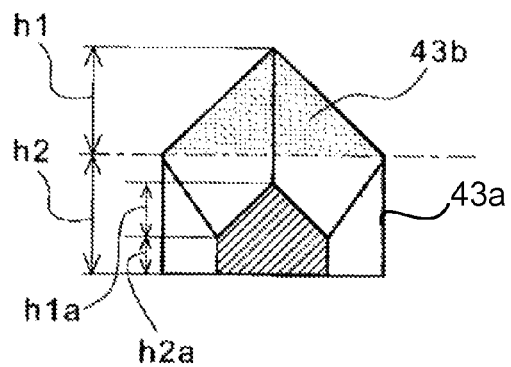
FIG. 10 is a cross-sectional view taken along line A-A of FIG. 9.

An example of a shape of the pointer 43 will be described in detail below. FIG. 9 is an enlarged side elevational view showing a main section of the pointer 43. FIG. 10 is a cross-sectional view taken along line A-A of FIG. 9. Referring to FIG. 9, the ridge 63 of the pointer 43 has a gradient such that the ridge 63 approaches the dial substrate 42 side more toward a leading end of the pointer relative to a center of rotation of the pointer 43, specifically, a position of an extension from the output shaft 44a. The pointer 43 is set to taper such that a vertical drop 60 of the ridge 63 caused by the gradient is greater than a vertical dimension h of the leading end of the pointer 43.

Referring further to FIG. 10, a ratio between a vertical dimension of the base portion 43a of the pointer 43 and a vertical dimension of the spine portion 43b is set such that the vertical dimension of the spine portion 43b is greater at a position near the leading end of the pointer 43 than at a trailing end (a portion above the center of rotation) of the pointer 43. Specifically, in FIG. 10, the shape of the pointer 43 is determined so as to satisfy a dimensional ratio of "h1/h2<h1a/h2a."

It is of interest to note that the shape of the spine portion 43b to achieve an acute ridge angle β for the spine portion 43b of the pointer 43 is not limited only to the embodiment described above. The point is that the shape of the spine portion 43b has only to be set such that, with the pointer 43 pointing to the scale in a crosswise direction of the vehicle body, the surface on the forward side of the two surfaces forming the spine portion 43b is invisible from the rider of the motorcycle 1 sitting in the rider's seat 6.

Embodiments of the present invention have been described by using, as an example, a speedometer that indicates vehicle speed with a pointer and a scale. Embodiments of the present invention are not limited only to the speedometer, but may also be other gauges including, but not limited to, an engine tachometer, a fuel level meter, or an engine coolant temperature gauge.

DESCRIPTION OF REFERENCE SYMBOLS

1: Motorcycle, 5: Fuel tank, 6: Rider's seat, 15: Steering handlebar, 30: Meter mounting base, 31: Meter device, 42: Dial substrate, 43: Pointer, 43a: Base portion, 43b: Spine portion, 43c: Base lower surface, 47: Connecting member, 63: Ridge

We claim:
1. A meter device for a motorcycle, the meter device comprising:
   a dial substrate having a scale; and
   a pointer that points to the scale corresponding to a measurement output, wherein, the pointer includes a ridge that extends in a longitudinal direction, and a spine portion having two surfaces that cross each other so as to form the ridge, the spine portion is shaped such that, with the pointer pointing to the scale in a crosswise direction of a vehicle body, a surface on a vehicle forward side of the two surfaces forming the spine portion is invisible by a rider of a motorcycle sitting in a rider's seat, the ridge of the pointer has a gradient such that the ridge approaches a side of the dial substrate more toward a leading end of the pointer relative to a center of rotation of the pointer, and wherein a vertical drop of the ridge caused by the gradient is set to be greater than a vertical dimension of the leading end of the pointer.

2. The meter device according to claim 1, wherein:

an angle (β), at which the two surfaces forming the ridge cross each other, is acute.

3. The meter device according to claim 1, further comprising:

a drive portion configured to drive the pointer;

a connecting member connecting the pointer with an output shaft of the drive portion, wherein, the pointer is disposed on a mounting seat of the connecting member; and a base portion that is downwardly continuous with the spine portion of the pointer includes a lowermost surface extended more on a side of the dial substrate than the mounting seat.

4. The meter device according to claim 1, wherein the pointer and the scale constitute a speed indicator of the motorcycle.

5. The meter device according to claim 1, wherein the meter device is disposed on a fuel tank that is disposed between a steering handlebar and a rider's seat.

6. The meter device according to claim 1, wherein a clearance between a lower surface of the pointer and the dial substrate is set to be equal to, or less than, a vertical dimension of the pointer.

7. The meter device according to claim 1, wherein a ratio between a vertical dimension of the base portion of the pointer and a vertical dimension of the spine portion of the pointer is set such that the vertical dimension of the spine portion is greater than the vertical dimension of the base portion toward the leading end of the pointer.

8. A meter device for a motorcycle, the meter device comprising:

dial face means for supporting a dial scale thereupon; and pointer means for pointing to the dial scale corresponding to a measurement output, wherein, the pointer means includes a ridge means and a spine means, said ridge means and said spine means extending in the longitudinal direction, said spine means including two surfaces that cross each other so as to form the ridge means, the spine means is for pointing to the dial scale in a crosswise direction of a vehicle body wherein a surface on a vehicle forward side of the two surfaces forming the spine means is invisible by a rider of the motorcycle sitting in a rider's seat, the ridge means has a gradient such that the ridge means approaches a side of the dial face means more toward a leading end of the pointer means relative to a center of rotation of the pointer means, and wherein a vertical drop of the ridge means caused by the gradient is set to be greater than a vertical dimension of the leading end of the pointer means.

9. The meter device according to claim 8, wherein the two surfaces of the spine means cross each other at an acute angle to form the ridge means.

10. The meter device according to claim 8, further comprising drive means for driving the pointer means;

connecting means for connecting the pointer means with an output shaft of the drive means, wherein the pointer means is disposed on a mounting seat of the connecting means; and base means, downwardly continuous with the spine means said base means including a lowermost surface extended more on a side of the dial face means than the mounting seat.

11. The meter device according to claim 8, wherein the pointer means and the scale constitute a speed indicator of the motorcycle.

12. The meter device according to claim 8, wherein the meter device is disposed on a fuel tank of the motorcycle, said fuel tank being disposed between a steering handle bar and a rider's seat.

13. The meter device according to claim 8, wherein a lower surface of the pointer means and the dial face means are set to have a clearance which is equal to or less than a vertical dimension of the pointer means.

14. The meter device according to claim 8, wherein a ratio between a vertical dimension of the base means and a vertical dimension of the spine means of the pointer means is set such that the vertical dimension of the spine means is greater than the vertical dimension of the base means toward the leading end of the pointer means.

* * * * *